2,736,755
Patented Feb. 28, 1956

2,736,755

PROCESS FOR RECOVERING CYCLOHEXANE FROM THE WASTE GAS PRODUCED IN THE OXIDATION THEREOF

Walter Reuter, Werner Neumann, and Wilhelm Dietrich, Marl in Westphalia, Germany, assignors to Chemische Werke Huls Aktiengesellschaft, a corporation of Germany No Drawing. Application March 11, 1953,
Serial No. 341,814

Claims priority, application Germany March 28, 1952

5 Claims. (Cl. 260—666)

In the oxidation of cyclohexane in liquid phase with oxygen-containing gas, waste gas is produced which contains substantial amounts of the reactants and reaction products, especially cyclohexane, cyclohexanol, cyclohexanone and water. To recover these materials one may scrub the waste gas with an oily hydrocarbon and separate the absorbed materials by distillation. In the distillation a ternary azeotropic mixture of cyclohexane, water and oily hydrocarbon distills. It is difficult to recover the oily hydrocarbon from this mixture and it usually is uneconomical to do so and losses thereof are unavoidable. In order to distill the cyclohexanol the temperature must be raised so high that the accompanying cyclohexanone is resinified. As a result a washing apparatus operated with a wash oil composed of hydrocarbons having 10–12 carbon atoms, after only a relatively short period of use, becomes so heavily encrusted with resin that it is inefficient.

It has been found that the above-mentioned disadvantages in the washing of the waste gas from the oxidation of cyclohexane in liquid phase with oxygen-containing gas may be avoided by using cyclohexanol as the washing liquid. The cyclohexanol, especially when cold and under pressure absorbs the cyclohexane, cyclohexanol, cyclohexanone and water out of the waste gas so extensively that the washed waste gas is practically free of cyclohexanol and cyclohexanone and contains only a trace of cyclohexane. The content of cyclohexane in the washed waste gas depends upon the temperature at which the washing liquid is used and the lower is the temperature the lower is the cyclohexane content of the washed waste gas. For this reason it is advantageous to carry out the washing at the lowest possible temperature. One may carry out the washing at 0° C. if the freezing point of the cyclohexanol is lowered for example by the addition of cyclohexyl esters which are produced as by-products by the oxidation of the cyclohexane.

In regenerating the washing liquid it is heated up until the cyclohexane distills partly as a ternary azeotropic mixture with water and cyclohexanol. After condensation the cyclohexane can be returned to the oxidation step. The cyclohexanol left as residue of the distillation contains a small amount of cyclohexanone which however is not resinified at the temperature employed in the distillation of the cyclohexane. For this reason one may avoid the separation of cyclohexanone from the washing liquid. The whole washing liquid after sufficient enrichment with cyclohexanone may be withdrawn from the process and replaced by cyclohexanol produced by the oxidation process.

The process advantageously is carried out in a filled tower in which the waste gas passes upwardly countercurrent to the downwardly trickling cyclohexanol. The especial advantages of the process are that the loss of washing liquid is reduced, the cyclohexanol-containing cyclohexane recovered from the washing liquid can be used as such as the washing liquid in the continuation of the process, the recovery of the cyclohexane is accomplished with a small expenditure of energy and the resinification of the washing tower is avoided.

Example

An apparatus for the oxidation of cyclohexane with air with a throughput of 3.2 cubic meters of cyclohexane per hour, produces 380 cubic meters of waste gas per hour. This waste gas is passed upwardly through a wash tower filled with Raschig rings and having a diameter of 300 millimeters and a height of 500 millimeters at a pressure of 5.5 atmospheres pressure while cyclohexanol at 3° C. is trickled down the tower at the rate of 1.2 cubic meters per hour. The cyclohexane content of the waste gas before washing is 5%. The contents of cyclohexanol and cyclohexanone are relatively small. After washing the waste gas contains 0.3% of cyclohexane and is practically free of cyclohexanol and cyclohexanone. The cyclohexane is recovered from the wash liquid partly as a ternary azeotropic mixture with small amounts of cyclohexanol and water by distillation and is returned to the process. The distillation residue which consists essentially of cyclohexanol and contains cyclohexanone is cooled to 3° C. and is recycled as washing liquid for several months and is then substituted by cyclohexanol. Resinification of the tower does not occur in a long period of operation.

We claim:

1. In the process for the recovery of cyclohexane by scrubbing with an absorbing liquid the waste gas produced in the oxidation of cyclohexane by passing an oxygen-containing gas in contact with liquid cyclohexane, the improvement which consists in using a liquid consisting essentially of cyclohexanol as the absorbing liquid.

2. Process as defined in claim 1 in which the absorbing liquid contains a substance which lowers the freezing point of the cyclohexanol.

3. Process as defined in claim 1 in which the absorbing liquid contains a cyclohexyl ester.

4. Process as defined in claim 1 in which the waste gas is scrubbed under superatmospheric pressure.

5. Process as defined in claim 1 in which the waste gas is scrubbed at a superatmospheric pressure of several atmospheres and the scrubbing liquid is maintained at a temperatures in the neighborhood of 0° C.

References Cited in the file of this patent

UNITED STATES PATENTS

| | | |
|---|---|---|
| 2,223,494 | Loder | Dec. 3, 1940 |
| 2,322,354 | Gerhold et al. | June 22, 1943 |
| 2,342,165 | Plummer | Feb. 22, 1944 |
| 2,410,642 | Farkas et al. | Nov. 5, 1946 |
| 2,565,087 | Porter et al. | Aug. 21, 1951 |